(12) United States Patent
Ohta et al.

(10) Patent No.: US 7,816,037 B2
(45) Date of Patent: Oct. 19, 2010

(54) ANODE MATERIAL FOR LITHIUM ION SECONDARY BATTERY

(75) Inventors: Naoto Ohta, Kagawa (JP); Katsuhide Nagaoka, Kagawa (JP); Kazuhito Hoshi, Kagawa (JP); Hidehiko Nozaki, Kagawa (JP); Tetsuro Tojo, Kagawa (JP); Toshiaki Sogabe, Kagawa (JP)

(73) Assignee: Toyo Tanso Co., Ltd., Osaka-shi (JP)

( * ) Notice: Subject to any disclaimer, the term of this patent is extended or adjusted under 35 U.S.C. 154(b) by 816 days.

(21) Appl. No.: 10/501,333

(22) PCT Filed: Jan. 24, 2003

(86) PCT No.: PCT/JP03/00631

§ 371 (c)(1), (2), (4) Date: Jul. 23, 2004

(87) PCT Pub. No.: WO03/063274

PCT Pub. Date: Jul. 31, 2003

(65) Prior Publication Data

US 2005/0158550 A1    Jul. 21, 2005

(30) Foreign Application Priority Data

Jan. 25, 2002  (JP) ............................. 2002-017270
Nov. 1, 2002   (JP) ............................. 2002-319227

(51) Int. Cl.
    H01M 4/58    (2010.01)
(52) U.S. Cl. .............................. 429/231.4; 429/231.95; 429/218.1
(58) Field of Classification Search ............ 429/231.95, 429/234.4, 231.8, 218.1
    See application file for complete search history.

(56) References Cited

U.S. PATENT DOCUMENTS 6,355,377 B1    3/2002  Sheem et al.

(Continued)

FOREIGN PATENT DOCUMENTS

CA    2176452    11/1997

(Continued)

OTHER PUBLICATIONS

Polymers: A Property Database. Polyvinyl Alcohol. Dec. 9, 2008. <http://db.polymersnetbase.com>.*

(Continued)

*Primary Examiner*—Dah-Wei D Yuan
*Assistant Examiner*—Zachary Best
(74) *Attorney, Agent, or Firm*—Oblon, Spivak, McClelland, Maier & Neustadt, L.L.P.

(57) ABSTRACT

The invention provides an anode material for lithium ion secondary battery using a coated graphite powder as a raw material, which is coated thermoplastic resin of a carbonization yield of ≦20 wt% in a proportion of ≦10 parts by weight the carbonized material per 100 parts by weight graphite powder. Coating with thermoplastic resin increases the accumulative pore volume by ≦5%, relative to the uncoated powder, and results in pore sizes of 0.012-40 μm via mercury porosimeter method. Calculated with the BJH method as viewed from desorption isotherm, the coated graphite powder has a mesopore volume ≦0.01 cc/g or ≦60% of the pore volume of the uncoated graphite powder. This coated powder also has an average particle size ranging from 10-50 μm measured by a laser-scattering-particle-size-distribution measuring device, and a standard deviation to the average particle size (σ/D) ratio of ≦0.02.

29 Claims, 1 Drawing Sheet

| | Coating Amount (Parts by Wt.) | Increasing rate of accumulative pore volume (%) | mesopore volume (cc/g) | Increasing rate of mesopore volume (After coating/before coating) (%) | BET specific surface area (m²/g) | σ/D | R | H/C | Oxidation-corrosion rate Wt% | Electrolytic solution | Discharge capacity mAh/g | Residual capacity rate (%) (Discharge capacity (-5℃)/Discharge capacity (25℃) | Initial efficiency (%) | Irreversible capacity mAh/g |
|---|---|---|---|---|---|---|---|---|---|---|---|---|---|---|
| Ex. 1 | 5 | 30.5 | 0.0051 | 28.3 | 2.3 | 0.012 | 0.34 | <0.01 | 2.96 | EC/DMC | 358 | - | 92.1 | 28.2 |
| Ex. 2 | 2 | 9.3 | 0.0083 | 46.1 | 3.0 | 0.015 | 0.37 | <0.01 | 1.81 | EC/DMC | 358 | - | 90.4 | 38.1 |
| Ex. 3 | 8 | 10.7 | 0.0060 | 33.3 | 2.5 | 0.0085 | 0.35 | <0.01 | 3.53 | EC/DMC | 354 | - | 91.1 | 34.5 |
| Ex. 4 | 8 | 10.7 | 0.0060 | 33.3 | 2.5 | 0.0085 | 0.35 | <0.01 | 3.53 | EC/PC | 360 | - | 89.2 | 43.6 |
| Ex. 5 | 5 | 11.5 | 0.0083 | 29.5 | 3.1 | 0.011 | 0.34 | <0.01 | 2.84 | EC/DMC | 360 | - | 93.2 | 26.3 |
| Ex. 6 | 5 | 15.3 | 0.0055 | 20.9 | 1.6 | 0.008 | 0.34 | 0.2 | 2.77 | EC/DMC | 365 | - | 93.4 | 25.9 |
| Ex. 7 | 5 | 30.5 | 0.0051 | 28.3 | 2.3 | 0.012 | 0.34 | <0.01 | 2.96 | EC/DEC | 364 (25℃) 311 (-5℃) | 85.6 | 93.3 (25℃) 81.3 (-5℃) | 26.0 (25℃) 71.8 (-5℃) |
| Compara. Ex. 1 | 1 | 0.2 | 0.0135 | 75.0 | 3.7 | 0.018 | 0.20 | <0.01 | 0.13 | EC/DMC | 357 | - | 87.4 | 51.3 |
| Compara. Ex. 2 | 23 | -13.2 | 0.0055 | 30.6 | 1.7 | 0.007 | 0.51 | <0.01 | 19.9 | EC/DMC | 340 | - | 90.8 | 37.2 |
| Compara. Ex. 3 | 5 | 17.4 | 0.0050 | 27.8 | 2.6 | 0.012 | 0.47 | 0.02 | 1.00 | EC/DMC | 361 | - | 85.2 | 62.5 |
| Compara. Ex. 4 | 5 | 21.4 | 0.0063 | 35.0 | 2.4 | 0.012 | 0.12 | <0.01 | 0.13 | EC/DMC | 357 | - | 87.6 | 50.4 |
| Compara. Ex. 5 | 5 | 21.4 | 0.0063 | 35.0 | 2.4 | 0.012 | 0.12 | <0.01 | 0.13 | EC/PC | 321 | - | 20.8 | 1,222.3 |
| Compara. Ex. 6 | 5 | 21.8 | 0.0202 | 28.2 | 7.6 | 0.032 | 0.31 | <0.01 | 2.13 | EC/DMC | 350 | - | 80.0 | 87.5 |
| Compara. Ex. 7 | 0 | - | 0.0180 | - | 5.4 | 0.014 | 0.18 | <0.01 | 0.26 | EC/PC | 361 | - | 82.2 | 78.2 |
| Compara. Ex. 8 | 0 | - | 0.0180 | - | 5.4 | 0.014 | 0.18 | <0.01 | 0.26 | EC/DEC | 345 (25℃) 246 (-5℃) | 67.4 | 91.9 (25℃) 61.1 (-5℃) | 32.2 (25℃) 154.6 (-5℃) |

U.S. PATENT DOCUMENTS

| | | | |
|---|---|---|---|
| 6,596,437 B2 * | 7/2003 | Yoon et al. ............. | 429/231.95 |
| 2003/0049535 A1 | 3/2003 | Ohta et al. | |
| 2004/0214087 A1 * | 10/2004 | Sheem et al. ............. | 429/231.8 |

FOREIGN PATENT DOCUMENTS

| | | |
|---|---|---|
| DE | 195 47 376 | 6/1996 |
| EP | 0549802 | 7/1993 |
| EP | 847098 | 6/1998 |
| EP | 0 861 804 | 9/1998 |
| EP | 0 917 228 | 5/1999 |
| GB | 2 296 125 | 6/1996 |
| JP | 04-370662 | 12/1992 |
| JP | 05-094838 | 4/1993 |
| JP | 05-159771 | 6/1993 |
| JP | 05-217604 | 8/1993 |
| JP | 05-275076 | 10/1993 |
| JP | 05-290889 | 11/1993 |
| JP | 05-307976 | 11/1993 |
| JP | 05-307977 | 11/1993 |
| JP | 05-335016 | 12/1993 |
| JP | 09-213328 | 8/1997 |
| JP | 09-326254 | 12/1997 |
| JP | 10-012241 | 1/1998 |
| JP | 10-036108 | 2/1998 |
| JP | 10-59703 | 3/1998 |
| JP | 10-255851 | 9/1998 |
| JP | 10-284080 | 10/1998 |
| JP | 10-294111 | 11/1998 |
| JP | 10-321218 | 12/1998 |
| JP | 11-054123 | 2/1999 |
| JP | 11-199211 | 7/1999 |
| JP | 11-204109 | 7/1999 |
| JP | 11-246209 | 9/1999 |
| JP | 11-310405 | 11/1999 |
| JP | 11-343108 | 12/1999 |
| JP | 2000-003708 | 1/2000 |
| JP | 2000-058052 | 2/2000 |
| JP | 2000-106182 | 4/2000 |
| JP | 2000-123826 | 4/2000 |
| JP | 2000 251895 | 9/2000 |
| JP | 2000-306582 | 11/2000 |
| JP | 2000-311687 | 11/2000 |
| JP | 2000-348720 | 12/2000 |
| JP | 2000-357506 | 12/2000 |
| JP | 2000-357516 | 12/2000 |
| JP | 2001-035493 | 2/2001 |
| JP | 2001-126726 | 5/2001 |
| JP | 2001-143691 | 5/2001 |
| JP | 2001-196097 | 7/2001 |
| JP | 2001-202961 | 7/2001 |
| JP | 2001196097 A * | 7/2001 |
| JP | 2001-229917 | 8/2001 |
| JP | 2001-229924 | 8/2001 |
| JP | 2001-313031 | 11/2001 |
| JP | 2001-313032 | 11/2001 |
| JP | 2002-008656 | 1/2002 |
| JP | 2002-015740 | 1/2002 |
| JP | 2002-141062 | 5/2002 |
| JP | 2002-151069 | 5/2002 |
| JP | 2002-241117 | 8/2002 |
| JP | 2002-324580 | 11/2002 |
| JP | 2002-348109 | 12/2002 |
| JP | 2002-367611 | 12/2002 |
| JP | 2003-151551 | 5/2003 |
| JP | 2003-173774 | 6/2003 |
| JP | 2003-282145 | 10/2003 |

OTHER PUBLICATIONS

Masaki Yoshio, et al.; "Effect of Carbon Coating on Electrochemical Performance of Treated Natural Graphite as Lithium- Ion Battery Anode Material"; Journal of the Electrochemical Society, vol. 147, pp. 1245-1250, Apr. 2000.*

Inagaki, Michio et al. "A New Simple Process for Carbon Coating of Ceramic Particles using Poly(Vinyl Chloride)", Journal of the European Ceramic Society, vol. 18, pp. 1011-1015 1998.

Tomokazu Fukuzuda, et al.; "Surface Treatment of Carbonaceous Thin Films By $NF_3$ Plasma and their Electrochemical Properties"; Carbon film with its surface modified by using $NF_3$ plasma and the electrochemical property thereof; $41_{st}$ Battery Symposium in Japan of Nov. 2000, 2E12 at P592-593, published by Committee of Battery Technology, Electrochemical Society of Japan (w/partial English Translation).

* cited by examiner

|  | Coating Amount (Parts by Wt.) | Increasing rate of accumulative pore volume (%) | mesopore volume (cc/g) | Increasing rate of mesopore volume (After coating/before coating) (%) | BET specific surface area (m²/g) | σ/D | R | H/C | Oxidation-corrosion rate Wt% | Electrolytic solution | Discharge capacity mAh/g | | Residual capacity rate (%) (Discharge capacity (-5°C)/Discharge capacity (25°C)) | Initial efficiency (%) | | Irreversible capacity mAh/g | |
|---|---|---|---|---|---|---|---|---|---|---|---|---|---|---|---|---|---|
| Ex. 1 | 5 | 30.5 | 0.0051 | 28.3 | 2.3 | 0.012 | 0.34 | <0.01 | 2.96 | EC/DMC | 358 | | - | 92.1 | | 28.2 | |
| Ex. 2 | 2 | 9.3 | 0.0083 | 46.1 | 3.0 | 0.015 | 0.37 | <0.01 | 1.81 | EC/DMC | 358 | | - | 90.4 | | 38.1 | |
| Ex. 3 | 8 | 10.7 | 0.0060 | 33.3 | 2.5 | 0.0085 | 0.35 | <0.01 | 3.53 | EC/DMC | 354 | | - | 91.1 | | 34.5 | |
| Ex. 4 | 8 | 10.7 | 0.0060 | 33.3 | 2.5 | 0.0085 | 0.35 | <0.01 | 3.53 | EC/PC | 360 | | - | 89.2 | | 43.6 | |
| Ex. 5 | 5 | 11.5 | 0.0083 | 29.5 | 3.1 | 0.011 | 0.34 | <0.01 | 2.84 | EC/DMC | 360 | | - | 93.2 | | 26.3 | |
| Ex. 6 | 5 | 15.3 | 0.0055 | 20.9 | 1.6 | 0.008 | 0.34 | 0.2 | 2.77 | EC/DMC | 365 | | - | 93.4 | | 25.9 | |
| Ex. 7 | 5 | 30.5 | 0.0051 | 28.3 | 2.3 | 0.012 | 0.34 | <0.01 | 2.96 | EC/DEC | 364 (25°C) | 311 (-5°C) | 85.6 | 93.3 (25°C) | 81.3 (-5°C) | 26.0 (25°C) | 71.8 (-5°C) |
| Compara. Ex. 1 | 1 | 0.2 | 0.0135 | 75.0 | 3.7 | 0.018 | 0.20 | <0.01 | 0.13 | EC/DMC | 357 | | - | 87.4 | | 51.3 | |
| Compara. Ex. 2 | 23 | -13.2 | 0.0055 | 30.6 | 1.7 | 0.007 | 0.51 | <0.01 | 19.9 | EC/DMC | 340 | | - | 90.8 | | 37.2 | |
| Compara. Ex. 3 | 5 | 17.4 | 0.0050 | 27.8 | 2.6 | 0.012 | 0.47 | 0.02 | 1.00 | EC/DMC | 361 | | - | 85.2 | | 62.5 | |
| Compara. Ex. 4 | 5 | 21.4 | 0.0063 | 35.0 | 2.4 | 0.012 | 0.12 | <0.01 | 0.13 | EC/DMC | 357 | | - | 87.6 | | 50.4 | |
| Compara. Ex. 5 | 5 | 21.4 | 0.0063 | 35.0 | 2.4 | 0.012 | 0.12 | <0.01 | 0.13 | EC/PC | 321 | | - | 20.8 | | 1,222.3 | |
| Compara. Ex. 6 | 5 | 21.8 | 0.0202 | 23.2 | 7.6 | 0.032 | 0.31 | <0.01 | 2.13 | EC/DMC | 350 | | - | 80.0 | | 87.5 | |
| Compara. Ex. 7 | 0 | - | 0.0180 | - | 5.4 | 0.014 | 0.18 | <0.01 | 0.26 | EC/PC | 361 | | - | 82.2 | | 78.2 | |
| Compara. Ex. 8 | 0 | - | 0.0180 | - | 5.4 | 0.014 | 0.18 | <0.01 | 0.26 | EC/DEC | 365 (25°C) | 246 (-5°C) | 67.4 | 91.9 (25°C) | 61.1 (-5°C) | 32.2 (25°C) | 154.6 (-5°C) |

ANODE MATERIAL FOR LITHIUM ION SECONDARY BATTERY

CROSS REFERENCE TO RELATED APPLICATION

This application is a 371 of PCT/JP03/000631, filed on Jan. 24, 2003, and claims priority to the following Japanese Patent Applications: 2004-17270, filed on Jan. 25,2002; and 2002-319227, filed on Nov. 1, 2002.

TECHNICAL FIELD

The present invention relates to an anode for a lithium ion secondary battery. More particularly, the present invention relates to an anode material for a lithium ion secondary battery that can provide enhanced efficiency without reducing a reversible capacity and also can be used with propylene carbonate electrolyte which is restricted-use electrolytic solution in that the electrolytic solution is decomposed significantly in the initial stage of electric charge.

BACKGROUND ART

Along with miniaturization of electronic equipment, the demand for high energy density of a battery used to drive the electronic equipment is being increased. A lithium ion secondary battery rechargeable at high voltage and high energy density, in particular, is being developed increasingly. The lithium ion secondary battery comprises a cathode and an anode which are capable of occluding and releasing lithium ions, and electrolytic solution containing nonaqueous electrolyte. Artificial graphite created by graphitizing mesophase spherules or cokes from low-crystalline carbon material, such as carbon-resin, and, further, highly graphitized material, such as natural graphite, are used as the anode material. Further, material to be graphitized to such an extent that can satisfy the demand for high-energy density is being desired. It is found that graphitized materials, including natural graphite, have the discharge capacity close to a theoretical value, while on the other hand, they have generally a large irreversible capacity of not less than a few tens of mAh/g resulting from the decomposition of electrolytic solution on the anode in the initial stage of electric charge. This is a major hurdle to realize a high performance lithium ion secondary battery. Particularly when propylene carbonate is used for the electrolytic solution, the electrolytic solution is significantly decomposed on the anode. Due to this, the use of propylene carbonate for the electrolytic solution is largely restricted.

Various proposals have been hitherto made for the purpose of reducing the irreversible capacity resulting from the decomposition of the electrolytic solution. JP Laid-open Patent Publications No. Hei 4-370662 and No. Hei 5-335016 disclose a material comprising graphite particle, used for the anode material, whose surface is coated with organic carbonized material. JP Laid-open Patent Publication No. Hei 10-59703 discloses a method of coating carbonaceous powders with carbonized material of petroleum pitch or coal-tar pitch. JP Laid-open Patent Publication No. Hei 11-204109 discloses a material comprising graphite particle whose surface is coated in the form of carbon layer by the chemical vapor deposition method. In addition to these publications, Fukuzuka et al. discloses a graphite particle surface coating method using an oxidation method and an efficiency improving method using an $NF_3$ plasma process ("Carbon film with its surface modified by using the $NF_3$ plasma and the electrochemical property thereof", $41_{st}$ Battery Symposium in Japan of Nov. 2000, 2E12 at P 592-593, published by Committee of Battery Technology, Electrochemical Society of Japan). JP Laid-open Patent Publication No. Hei 11-204109 cited above, in particular, discloses an irreversible capacity reduction effect produced when propylene carbonate is used for the electrolytic solution.

However, the anode materials proposed, for example, by JP Laid-open Patent Publications No. Hei 4-370662, No. Hei 5-335016, and No. Hei 10-59703 cited above require a substantially large amount of carbonized material of not less than 10 weight % for coating the graphite powder. As mentioned therein, when these anode materials are analyzed in an X-ray wide-angle diffraction measurement, two diffraction lines corresponding to multilayered structure of the anode material appear clear. This structure often induces reduction of the discharge capacity so that the original capacity of graphite may not be developed, as described in JP Laid-open Patent Publication No. Hei 9-213328. This publication, JP Laid-open Patent Publication No. Hei 9-213328, discloses an anode material comprising 100 parts by weight graphite particle coated with not more than 12 parts by weight carbonized material, and a producing method thereof. However, the production of such an anode material involves powdering processes, such as pulverizing, requiring cumbersome and complicated powder handlings. Referring further to JP Laid-open Patent Publication No. Hei 11-204109 cited above, the anode material comprises uniformly coated graphite power, having a substantially small specific surface area of not more than 1 $m^2/g$. Generally, the anode having a small specific surface area exhibits poorness in quick recharge/discharge characteristic. It also shows poorness in miscibility with a binder resin, thus inducing the disadvantage that the coatability to copper foil is apt to worsen when producing the electrode. Further, Masaki Yoshio, et al ("Effect of Carbon Coating on Electrochemical Performance of Treated Natural Graphite as Lithium-Ion Battery Anode Material", Journal of Electrochemical Society, Vol. 147, pp 1245-1250, April 2000) discusses the same coating, presenting the data showing that as an amount of material coated increases, the discharge capacity decreases. From this, this related art also has the same problem as the problem of JP Laid-open Patent Publications No. Hei 4-370662 and No, Hei 5-335016. The surface oxidizing technique is extensively studied with the aim of increasing the discharge capacity, but it involves the problem that the effect is not provided stably. Also, the efficiency improving method using the $NF_3$ plasma process is now at a basic research level.

It is an object of the present invention to provide an anode material for a lithium ion secondary battery that can provide enhanced efficiency without reducing a reversible capacity, can reduce an irreversible capacity, and can be used with propylene carbonate electrolytic solution which is restricted-use electrolytic solution in that the electrolytic solution is decomposed significantly in the initial stage of electric charge.

DISCLOSURE OF THE INVENTION

To accomplish the object above, the inventors have examined the properties of various materials comprising graphite powder coated with carbonized material. It has been found from the examination results that the improved effect of the anode material for the lithium ion secondary battery is not developed simply by coating the graphite powder, serving as a core, with carbonized material, but largely depends on the properties of the graphite powder and coating film and their coated state. The present invention provides a novel anode material for lithium ion secondary battery comprising a coated graphite powder coated with a carbonized material of thermoplastic resin as a raw material, wherein the coated graphite powder has a mesopore volume defined by IUPAC of 0.01 cc/g or less as calculated with the BJH method as viewed from desorption isotherm, an average particle size ranging from 10 μm to 50 μm as measured by a laser-scattering-particle-size-distribution measuring device, and a ratio of standard deviation to the average particle size (σ/D) of 0.02 or less.

Since the mesopore volume is reduced to 0.01 cc/g or less by coating the graphite powder with the carbonized material of thermoplastic resin, the irreversible capacity resulting from the decomposition of the electrolytic solution can be reduced. When the mesopore volume is more than 0.01 cc/g, the irreversible capacity cannot be improved.

Also, since the average particle size ranges from 10 μm to 50 μm, the graphite powder can be coated with the carbonized material of thermoplastic resin so sufficiently as to improve adhesion of the anode material to a separator, thus ensuring the safety of the battery. It should be noted here that when the average particle size is smaller than 10 μm, the specific surface area increases, causing insufficient coating of the carbonized material and also triggering the reduction of the safety of the battery. On the other hand, when the average particle size is larger than 50 μm, the anode is reduced in planarity to reduce adhesion of the anode to the separator. Also, since a ratio of standard deviation to the average particle size (σ/D) is 0.02 or less, the effect of coating the graphite powder with the carbonized material can be fully realized to reduce the irreversible capacity significantly. When the σ/D is larger than 0.02, the coating effect is not fully realized, so that the irreversible capacity is not improved so much.

In the anode material for lithium ion secondary battery of the present invention, it is preferable that the coated graphite powder has a peak strength ratio R of 1,360 $cm^{-1}$ to 1,580 $cm^{-1}$ (R=$I_{1360}/I_{1580}$) of 0.4 or less as determined by a raman spectrum analysis using a wavelength of 532 nm.

Since a peak strength ratio R of 1,360 $cm^{-1}$ to 1,580 $cm^{-1}$ (R=$I_{1360}/I_{1580}$) of 0.4 or less, preferably 0.37 or less, or further preferably 0.35 or less, as determined by a raman spectrum analysis using a wavelength of 532 nm, a reduced irreversible capacity can be provided.

In the anode material for lithium ion secondary battery of the present invention, it is preferable that a rate of oxidation loss of the coated graphite powder when oxidized in atmospheres of 400° C. and an air mass flow of 3 l/min. for one hour is 2 wt % or more.

By forming a membranous film coating having a rate of oxidation loss of 2 wt % or more, the irreversible capacity can be reduced significantly and accordingly the resistance properties against propylene carbonate can be improved.

In the anode material for lithium ion secondary battery of the present invention, it is preferable that the coated graphite powder has a specific surface area in the range of 0.5 $m^2/g$ to 4 $m^2/g$ as calculated based on BET using nitrogen atom as absorptive.

Generally, a smaller specific surface area makes it hard to provide the quick recharge/discharge characteristic and provides the problem in the coatability to copper foil. On the other hand, a larger specific surface area provides an increased reaction area with the electrolytic solution, thus hindering the attainment of its intended purpose and impairing the safety. Accordingly, the specific surface area is preferably in the range of 0.5-4 $m^2/g$, or further preferably in the range of 0.5-3 $m^2/g$.

In the anode material for lithium ion secondary battery of the present invention, it is preferable that the coated graphite powder has an H/C value of 0.01 or less as determined by an elemental analysis.

The H/C value of 0.01 or less can contribute to reduction of the irreversible capacity. Where H represents a hydrogen atom and C represents a carbon atom, the H/C value is taken as an average value of an H/C atomic ratio and is given to a total carbonaceous material included in a multiphase structure including surface layer and nucleus.

In the anode material for lithium ion secondary battery of the present invention, it is preferable that the coated graphite powder is mixture of two different kinds of coated graphite powders different in average particle size from each other. Also, it is preferable that the mixture is mixed powders of graphite powder having an average particle size ranging from 15 μm to 25 μm and graphite powder having an average particle size ranging from 8 μm to 15 μm, and a mixing rate of the graphite powders is 50-90 wt %/50-10 wt % as expressed in terms of average particle size of 15-25 μm/average particle size of 8-15 μm.

It is preferable to use the mixture of two different kinds of coated graphite powders having the average particle size of 10-50 μm and different in average particle size from each other within the range of a ratio of standard deviation to the average particle size (σ/D) of 0.02 or less. A smaller average particle size is in the range of 8 μm-15 μm, or preferably in the range of 10 μm-13 μm, and a larger average particle size is in the range of 15 μm-25 μm, or preferably in the range of 18 μm-22 μm. When the anode material is prepared by coating this mixed graphite powder with the carbonized material of thermoplastic resin, an amount of anode material charged on the anode can be increased and also can control the specific surface area for an intended purpose of the battery without impairing the electrochemical characteristics.

In the anode material for lithium ion secondary battery of the present invention, it is preferable that the graphite powder has an average interlayer spacing $d_{002}$ of not more than 0.3380 nm and L(112) of not less than 5 nm as determined by the Gakushin-method for X-ray diffraction of carbon using an X-ray diffraction device.

For providing an increased discharge capacity, it is preferable that the average interlayer spacing $d_{002}$ is not more than 0.3380 nm and the L(112) is not less than 5 nm. Preferably, the $d_{002}$ is not more than 0.3370 nm and the L(112) is not less than 10 nm. Further preferably, the $d_{002}$ is not more than 0.3360 nm and the L(112) is not less than 15 nm.

In the anode material for lithium ion secondary battery of the present invention, it is preferable that an accumulative pore volume of the coated graphite powder increases 5% or more, as compared with an accumulative pore volume of the graphite powder having a pore size of 0.012 μm to 40 μm as measured by a mercury porosimeter method. In addition, it is preferable that the mesopore volume of the coated graphite powder is 60% or less of the mesopore volume of the graphite powder.

By coating the graphite powder with the carbonized material of thermoplastic resin, the coated graphite powder can be allowed to have in its surface a pore larger than the mesopore or an increased pore volume between particles and a reduced mesopore volume. The increase in volume of the pore larger than the mesopore facilitates the penetration of the electrolytic solution into the particles. On the other hand, the reduction of the mesopore volume enables reduction of the irreversible capacity resulting from the decomposition of the electrolytic solution. The term, "coating" here in the present invention means the coating of interior portions of the fine pores, rather than the coating of surfaces of the particles.

In the anode material for lithium ion secondary battery of the present invention, it is preferable that the coated graphite powder is coated with carbonized material of thermoplastic resin of a carbonization yield of not more than 20 wt % in a proportion of not more than 10 parts by weight the carbonized material per 100 parts by weight graphite powder.

This coating can keep the diffraction line on the surface of the coated graphite powder in the X-ray diffraction substantially unchanged.

In the anode material for lithium ion secondary battery of the present invention, it is preferable that the thermoplastic resin is any one of polyvinyl chloride, polyvinyl alcohol and polyvinyl pyrrolidone, or mixture thereof.

BRIEF DESCRIPTION OF THE DRAWINGS

FIG. 1 is a TABLE showing by a list various data of the anode material for lithium ion secondary battery according to the present invention.

BEST MODE FOR CARRYING OUT THE INVENTION

Graphite powder used in the present invention is the one whose crystal structure has an average interlayer spacing $d_{002}$ of not more than 0.3380 nm and L(112) of not less than 5 nm defined by the Gakushin-method for X-ray diffraction of carbon using an X-ray diffraction device. For proving an increased discharge capacity, it is desirable that the average interlayer spacing $d_{002}$ is not more than 0.3380 nm and L(112) is not less than 5 nm. Preferably, the $d_{002}$ is not more than 0.3370 nm and L(112) is not less than 10 nm. Further preferably, the $d_{002}$ is not more than 0.3360 nm and L(112) is not less than 15 nm. The graphite powder preferably has a spherical form, in terms of the coatability to copper sheet or foil and the scattering of lithium ions, though no particular limitation is imposed on the form of graphite powder. Natural graphite and the like often have a scale-like form. The scale-like form can be ensphered using a particle compounding system, such as a hybridization system available from Nara Machinery Co., Ltd. and a mechanofusion system available from Hosokawa Micron Corporation.

The graphite powder is coated with carbonized material of thermoplastic resin of not more than 20 wt % in carbonization yield in such a proportion as to be not more than 10 parts by weight carbonized material per 100 parts by weight graphite powder. As long as the thermoplastic resin used for the coating has the carbonization yield of not more than 20 wt %, no particular limitation is imposed thereon. For example, polyvinyl chloride (PVC), polyvinylidene chloride (PVDC), polyvinyl alcohol (PVA), polyethylene (PE), polyethylene terephthalate (PET), and polyvinyl pyrrolidone (PVP) can be cited as the thermoplastic resin. Particularly, polyvinyl chloride (PVC), polyvinyl alcohol (PVA), and polyvinyl pyrrolidone (PVP) can be preferably used. These may be used alone or in combination. This coating can keep the diffraction line in the X-ray diffraction substantially unchanged. When an increasing amount of average interlayer spacing $d_{002}$ defined by the Gakushin-method for X-ray diffraction of carbon is 0.0005 nm or less, the capacity of the graphite powder used as a core can be used effectively.

The graphite powder and the thermoplastic resin may be mixed by dry blending using a known mixer, such as a twin-cylinder mixer. Preferably, the graphite powder and the thermoplastic resin are mixed uniformly. As far as the graphite powder is not destructed by a shearing force, a ball mill, a hummer mill, or the like milling device may also be used for the mixing.

Usually, the baking of the mixture is carried out in an atmosphere of inert gas, such as nitrogen gas or argon gas. Any proper baking temperature may be selected as long as it is in the temperature range in which the carbonization can be completed. Usually, the baking temperature is in the range of 700° C. or more, or preferably 750° C. or more, to 1,100° C. or less, further preferably 1,000° C. or less, or even further preferably 950° C. or less. When the baking temperature is excessively low, the carbonization of the baked material comes to be incomplete, then providing insufficient performance for the electrode active material. On the other hand, when the baking temperature is excessively high, the baked material goes increase in crystallinity so that it can easily decompose the electrolytic solution, producing an adverse result to its intended purpose of reducing the irreversible capacity. A temperature rising rate is in the range of 10-500° C./h, or preferably in the range of 20-100° C./h, through no particular limitation is imposed thereon.

In the coated graphite powder thus coated with the carbonized material of thermoplastic resin, the accumulative pore volume of the pore having a pore size of 0.012 μm to 40 μm, as measured by the mercury porosimeter method, increases by 5% or more, as compared with that in the graphite powder before coated. In the pore size distribution analysis using nitrogen atom as absorptive, the micropore defined by IUPAC (International Union of Pure and Applied Chemistry) as determined using the t-plot method is substantially zero, and the mesopore volume defined by the same definition as calculated with the BJH method as viewed from desorption isotherm reduces to 0.01 cc/g or less which is equal to 60% or less of the pore volume of the graphite powder before coated. The terms, "micropore" and "mesopore" here mean pores existing in a group of bulk graphite particles. According to IUPAC, pores are generally classified as follows: pores with diameters exceeding 50 nm are called "macropores", pores with diameters ranging from 2 nm to 50 nm are called "mesopores", and pores with diameters not exceeding 2 nm are called "micropores". Also, the Barrett-Joyner-Halenda method (the BJH method) is an analyzing technique wherein assuming that pores have cylindrical forms, calculation is made in such a manner that an integrated value of surface areas of the pores takes a closest value to the BET specific surface area, following the equation (1) given below.

$$v_{12} = \frac{(r_K + \Delta t)^2}{r^2} V_{12} + C_X \Delta t \sum^{r_{max}} S(r) \Delta r \qquad \text{Eq (1)}$$

where $v_{12}$ is an increasing amount of adsorption when a relative pressure is changed from $x_1$ to $x_2$ (where $x_1 < x_2$), $r_k$ is an average value of a pore radius to be determined, $\Delta t$ is variation in thickness of a polymolecular adsorption layer, r is an average value of a pore radius, $V_{12}$ is a pore volume from a pore radius $r_1$ to a pore radius $r_2$, Cx is a parameter (choose it from 0.75, 0.80, 0.85 and 0.90), and S is a surface area of pore.

The coated graphite powder thus obtained, as coated with the carbonized material of thermoplastic resin, is subjected to adjustment of particle size by a simple sifting, without any pulverizing process, after baking. Then, the resulting coated graphite powder can be used in combination with a binder and a binder-soluble solvent to make a dispersible coating. The binder is required to be stable for the electrolytic solution and the like, and a variety of binder materials are used in terms of weathering resistance, chemical resistance, heat resistance, and flame retardancy. To be specific, the binders that may be used include, for example, inorganic compounds, such as silicate and glass, alkane polymers, such as polyethylene, polypropylene and poly-1,1-dimethylethylene, unsaturated polymers, such as polybutadiene and polyisoprene, and polymers having a ring structure in a polymer chain, such as polystyrene, polymethylstyrene, polyvinylpyridine and poly-N-vinylpyrrolidone. Other binder materials that may be used include, for example, acrylic derivative polymers, such as polymethyl methacrylate, polyethyl methacrylate, polybutyl methacrylate, polymethyl acrylate, polyethyl acrylate, polyacrylic acid, polymethacrylic acid and polyacrylamide, fluorocarbon resins, such as polyvinyl fluoride, polyvinylidene fluoride and polytetrafluoroethylene, CN-group-containing polymers, such as polyacrylonitrile and polyvinylidene cyanide, polyvinyl alcohol polymers, such as polyvinyl acetate and polyvinyl alcohol, halogen-containing polymers, such as polyvinyl chloride and polyvinylidene chloride, and conductive polymers such as polyaniline.

Mixtures of the polymers above, modifications thereof, derivatives thereof, random copolymers thereof, alternating copolymers thereof, graft copolymers thereof, block copolymers thereof may also be used. These resins usually have the weight-average molecular weight ranging from about 10,000 to about 3,000,000, or preferably from about 100,000 to about 1,000,000. An excessively low weight-average molecular weight of the resin develops a tendency to reduce strength of a coating film. On the other hand, an excessively high weight-average molecular weight of the resin may increase the viscosity so much as to make it hard to form the electrode. Fluorocarbon resins and CN-group-containing polymers can be cited as preferable binder. Among others, poly vinylidene fluoride is further preferable.

An amount of binder used usually ranges from not less than 0.1 parts by weight, or preferably not less than 1 parts by weight, to not more than 30 parts by weight, or preferably not more than 20 parts by weight, per 100 parts by weight coated graphite powder coated with carbonized material of thermoplastic resin. An excessively less amount of binder develops a tendency to reduce strength of the electrode, while on the other hand, an excessively more amount of binder develops a tendency to reduce ion conductance. The solvent used in the present invention may be properly chosen from those that can dissolve the binder used. For example, N-methylpyrrolidone and dimethylformamide can be cited as the solvent. N-methylpyrrolidone is preferably used. The solvent concentration is at least 10 wt % or is usually in the range from not less than 20 wt %, preferably not less than 30 wt %, or further preferably not less than 35 wt %, to not more than 90 wt %, or preferably not more than 80 wt %. When the solvent concentration is less than 10 wt %, it may become hard to do the coating, while on the other hand, when the solvent concentration is more than 90 wt %, it may become hard to increase film thickness and may induce reduction in stability of the coating material.

In the following, the present invention will be described concretely with reference to Examples. It is to be noted that the present invention is not limited to the illustrated examples.

EXAMPLE 1

50 parts by weight polyvinyl alcohol powder was mixed in 100 parts by weight natural graphite powder having an average interlayer spacing $d_{002}$ of 0.3354 nm, a three dimensional crystallite size $L(112)$ of 27 nm, and an average particle size of 20 μm, as defined by the Gakushin-method for X-ray diffraction of carbon using an X-ray diffraction device, by dry blending at room temperature for ten minutes using a mixer. Then, the mixed graphite powder was put in a graphite crucible and closed the lid. With the temperature increased to 900° C. at a temperature rising rate of 300° C./h, the mixture was held at 900° C. for one hour and thereafter it was cooled down. Then, the mixture was sifted out through a screen with an opening size of 63 μm. The coated graphite powder with its surface coated with carbonized material, having a ratio of standard deviation to an average particle size of 24 μm (σ/D) of 0.012 and a mesopore volume of 0.0051 cc/g, was obtained in the manner mentioned above. Then, slurries containing 10 wt % binder of polyvinylidene fluoride were prepared from the coated graphite powder thus obtained using N-methylpyrrolidone as the solvent. After the slurries were coated on a copper foil, the solvent was fully evaporated therefrom. Then, the copper foil coated with the slurries was rolled to have an approximate density of 11.0 g/cm$^3$ using a roll press, to obtain the anode. The anode was used to produce a triode cell. Lithium metals were used for a counter electrode and a reference electrode, respectively, and 1M-LiClO$_4$-containing ethylene carbonate (EC)/dimethyl carbonate (DMC) (=1/1 vol %) was used for the electrolytic solution. The triode cell thus obtained was charged up to 4 mV under a constant electric current in a current density of 1.56 mAcm$^{-2}$ at 25° C., then was charged under a constant voltage until a current value reached 0.02 mAcm$^{-2}$, and then was discharged to 1.5V in a current density of 1.56 mAcm$^{-2}$.

EXAMPLE 2

Except that a mixing ratio of polyvinyl alcohol powder was changed to 25 parts by weight, the same prescription as that of Example 1 was taken to produce a coated graphite powder coated with a carbonized material having a ratio of standard deviation to an average particle size of 24 μm (σ/D) of 0.015 and a mesopore volume of 0.0083 cc/g. This coated graphite powder was electrochemically measured in the same manner as in Example 1.

EXAMPLE 3

Except that a mixing ratio of polyvinyl alcohol powder was changed to 75 parts by weight, the same prescription as that of Example 1 was taken to produce a coated graphite powder coated with a carbonized material having a ratio of standard deviation to an average particle size of 24 μm (σ/D) of 0.0085 and a mesopore volume of 0.0060 cc/g. This coated graphite powder was electrochemically measured in the same manner as in Example 1.

EXAMPLE 4

Except that the coated graphite powder as produced in the same manner as in Example 3 was used and that 1M-LiClO$_4$-containing EC/prolylene carbonate (PC) (=3/1 vol %) was used for the electrolytic solution, the same prescription as that of Example 1 was taken and the electrochemical measurement was conducted in the same manner as in Example 1.

EXAMPLE 5

Except that the mixed powder comprising 50 parts by weight natural graphite powder having an average interlayer spacing $d_{002}$ of 0.3354 nm, a three dimensional crystallite size $L(112)$ of 27 nm, and an average particle size of 24 μm, as defined by the Gakushin-method for X-ray diffraction of carbon using an X-ray diffraction mixed in 50 parts by weight natural graphite powder having an average interlayer spacing $d_{002}$ of 0.3354 nm, a three dimensional crystallite size L(112) of 27 nm, and an average particle size of 12 μm, as defined by the Gakushin-method for X-ray diffraction of carbon using an X-ray diffraction device, the same prescription was taken to produce a coated graphite powder coated with a carbonized material having a ratio of standard deviation to an average particle size of 19 μm (σ/D) of 0.011 and a mesopore volume of 0.0083 cc/g. This coated graphite powder was electrochemically measured in the same manner as in Example 1.

EXAMPLE 6

The same prescription was taken using 100 parts by weight natural graphite powder having an average interlayer spacing $d_{002}$ of 0.3355 nm, a three dimensional crystallite size L(112) of 27 nm, and an average particle size of 19 μm, as defined by the Gakushin-method for X-ray diffraction of carbon using an X-ray diffraction device, to produce a coated graphite powder coated with a carbonized material having a ratio of standard deviation to an average particle size of 23 μm (σ/D) of 0.008 and a mesopore volume of 0.0055 cc/g. This coated graphite powder was electrochemically measured in the same manner as in Example 1.

EXAMPLE 7

The triode cell shown in Example 1 was used with 1M-LiPF$_6$-containing EC/diethyl carbonate (DEC) (=3/7 vol %) as the electrolytic solution and was charged in the same conditions as in Example 1 and then discharged in a current density of 3.12 mAcm$^{-2}$. In an atmosphere temperature of 25° C., the discharge capacity of 363.6 mAh/g was obtained. In an atmosphere temperature of −5° C., the discharge capacity was 311.2 mAh/g and a residual capacity for 25° C. was 85.6%.

Comparative Example 1

Except that a mixing ratio of polyvinyl alcohol powder was changed to 10 parts by weight, the same prescription as that of Example 1 was taken to produce a coated graphite powder coated with a carbonized material having a ratio of standard deviation to an average particle size of 24 μm (σ/D) of 0.018 and a mesopore volume of 0.0135 cc/g. This coated graphite powder was electrochemically measured in the same manner as in Example 1.

Comparative Example 2

Except that a mixing ratio of polyvinyl alcohol powder was changed to 200 parts by weight, the same prescription as that of Example 1 was taken to produce a coated graphite powder coated with a carbonized material having a ratio of standard deviation to an average particle size of 24 μm (σ/D) of 0.007, a mesopore volume of 0.0055 cc/g, and a R value of 0.51. This coated graphite powder was electrochemically measured in the same manner as in Example 1.

Comparative Example 3

Except that the heat treatment after the dry-blending was carried out at 600° C. lower than the heat-treatment temperature in Example 1, the same prescription as that of Example 1 was taken to produce a coated graphite powder coated with a carbonized material having a ratio of standard deviation to an average particle size of 24 μm (σ/D) of 0.012, a mesopore volume of 0.0050 cc/g, a R value of 0.47, and a H/C of 0.02. This coated graphite powder was electrochemically measured in the same manner as in Example 1.

Comparative Example 4

Except that the heat treatment after the dry-blending was carried out at 1,300° C. higher than the heat-treatment temperature in Example 1, the same prescription as that of Example 1 was taken to produce a coated graphite powder coated with a carbonized material having a ratio of standard deviation to an average particle size of 24 μm (σ/D) of 0.012, a mesopore volume of 0.0063 cc/g and a rate of oxidation loss of 0.13 wt %. This coated graphite powder was electrochemically measured in the same manner as in Example 1.

Comparative Example 5

Except that the coated graphite powder as produced in the same manner as in Comparative Example 4 was used and that 1M-LiClO$_4$-containing EC/prolylene carbonate (PC) (=3/1 vol %) was used for the electrolytic solution, the same prescription as that of Example 1 was taken and the electrochemical measurement was conducted in the same manner as in Example 1.

Comparative Example 6

Except that natural graphite powder having an average interlayer spacing $d_{002}$ of 0.3356 nm, a three dimensional crystallite size L(112) of 19 nm, and an average particle size of 6.1 μm, as defined by the Gakushin-method for X-ray diffraction of carbon using an X-ray diffraction device, was used, the same prescription was taken to produce a coated graphite powder coated with a carbonized material having a ratio of standard deviation to an average particle size of 8.2 μm (σ/D) of 0.032 and a mesopore volume of 0.0202 cc/g. This coated graphite powder was electrochemically measured in the same manner as in Example 1.

Comparative Example 7

The natural graphite powder used in Example 1 was used as it was, without being coated with any carbonized material. Then, slurries containing 10 wt % binder of poly vinylidene fluoride were prepared from the natural graphite powder using N-methylpyrrolidone as the solvent. After the slurries were coated on a copper foil, the solvent was fully evaporated therefrom. Then, the copper foil coated with the slurries was rolled to have an approximate density of 1.0 g/cm$^3$ using a roll press, to obtain the anode. The anode was used to produce a triode cell. Lithium metals were used for a counter electrode and a reference electrode, respectively, and 1M-LiClO$_4$-containing EC/propylene carbonate (PC) (=3/1 vol %) was used for the electrolytic solution. The triode cell thus obtained was charged up to 4 mV under a constant electric current in a current density of 1.56 mAcm$^{-2}$, then was charged under a constant voltage until a current value reached 0.02 mAcm$^{-2}$, and then was discharged to 1.5V in a current density of 1.56 mAcm$^{-2}$.

Comparative Example 8

The triode cell shown in Comparative Example 7 was used with 1M-LiPF$_6$-containing EC/diethyl carbonate (DEC) (=3/7 vol %) as the electrolytic solution and was charged in the same conditions as in Example 1 and then discharged in a current density of 3.12 mAcm$^{-2}$. In an atmosphere temperature of 25° C., the discharge capacity of 365.2 mAh/g was obtained. In an atmosphere temperature of −5° C., the discharge capacity was 246.2 mAh/g and a residual capacity for 25° C. was 67.4%.

A list various measurement data are shown in FIG. 1.

It can be seen from FIG. 1 that the anode materials having a mesopore volume of not more than 0.01 cc/g, as defined by IUPAC, a ratio of standard deviation to an average particle size (σ/D) of not more than 0.02, and a R value of not more than 0.4, can provide an improved initial efficiency and a reduced irreversible capacity. Also, the anode material having the rate of oxidation loss of not less than 2 wt % can be given resistance properties against the propylene carbonate electrolytic solution and thus can be used with propylene carbonate electrolyte.

Also, as shown in Example 7 and Comparative Example 8, the anode material for lithium ion secondary battery according to the present invention has a higher residual capacity rate of a discharge capacity for −5° C. to a discharge capacity for 25° C., than the conventional anode material has. The residual capacity rate of a discharge capacity for −5° C. to a discharge capacity for 25° C. is preferably 70% or more, or further preferably 80% or more. This can suppress rapid deterioration of characteristics of the anode material in a low temperature.

Capability of Exploitation in Industry

The anode material for lithium secondary battery of the present invention as constructed as described above can accomplish enhanced efficiency without reducing a reversible capacity, can reduce an irreversible capacity, and can be used even with propylene carbonate electrolytic solution which is restricted-use electrolytic solution in that the electrolytic solution is decomposed significantly in the initial stage of electric charge.

The invention claimed is:

1. An anode material for lithium ion secondary battery comprising a coated graphite powder, which is a graphite powder in which interior portions of fine pores are coated with a carbonized material of thermoplastic resin, wherein the coated graphite powder has:
   (1) a mesopore volume defined by IUPAC is 0.01 cc/g or less as calculated with the BJH method as viewed from desorption isotherm;
   (2) an average particle size as measured by a laser-scattering-particle-size-distribution measuring device ranges from 10 μm to 50 μm, and a ratio of standard deviation to the average particle size, σ/D, is 0.02 or less;
   (3) a peak strength ratio R of 1,360 cm$^{-1}$ to 1,580 cm$^{-1}$ is 0.4 or less as determined by a Raman spectrum analysis with a wavelength of 532 nm, where R=$I_{1360}/I_{1580}$;
   (4) a rate of oxidation loss when oxidized in atmospheres of 400° C. and an air mass flow of 3 L/min. for one hour is 2 wt % or more;
   (5) a specific surface area is in the range of 1.6 m$^2$/g to 3.1 m$^2$/g as calculated based on BET with nitrogen as the absorptive; and
   (6) an average interlayer spacing $d_{002}$ of not more than 0.3380 nm and L(112) of not less than 5 nm as determined by the Gakushin-method for X-ray diffraction of carbon employing an X-ray diffraction device.

2. The anode material for lithium ion secondary battery according to claim 1, wherein the coated graphite powder has an H/C value of 0.01 or less as determined by an elemental analysis.

3. The anode material for lithium ion secondary battery according to claim 1, wherein an accumulative volume of the coated graphite powder increases 5% or more, as compared with an accumulative pore volume of the graphite powder having a pore size of 0.012 μm to 40 μm as measured by a mercury porosimeter method.

4. The anode material for lithium ion secondary battery according to claim 1, wherein the mesopore volume of the coated graphite powder is 60% or less of the mesopore volume of the graphite powder.

5. The anode material for lithium ion secondary battery according to claim 1, wherein the coated graphite powder is coated with carbonized material of thermoplastic resin of a carbonization yield of not more than 20 wt % in a proportion of not more than 10 parts by weight the carbonized material per 100 parts by weight graphite powder.

6. The anode material for lithium ion secondary battery according to claim 1, wherein the thermoplastic resin is selected from the group consisting of polyvinyl chloride, polyvinyl alcohol and polyvinyl pyrrolidone, and a mixture thereof.

7. The anode material according to claim 1, made by a process comprising:
   i) dry-blending a first graphite powder with a first resin powder to form a mixture;
   ii) baking said mixture in the presence of nitrogen or argon gas to obtain a baked graphite powder; and
   iii) sifting said baked graphite powder to form the coated graphite powder.

8. A process for the making anode material according to claim 1, comprising:
   i) dry-blending a first graphite powder with a first resin powder to form a mixture; and
   ii) baking said mixture in the presence of nitrogen or argon gas to obtain a baked graphite powder.

9. The process according to claim 8, further comprising:
   iii) sifting said baked graphite powder to obtain coated graphite powder.

10. The process according to claim 8, wherein said baking occurs at a temperature ranging from 700 to 1,100.

11. The anode material according to claim 1, wherein an average interlayer spacing $d_{002}$ of coated graphite powder increases by at most 0.0005 nm, from the average interlayer spacing $d_{002}$ of uncoated graphite powder.

12. The anode material according to claim 1, wherein said graphite powder is in the form of a sphere.

13. The anode material according to claim 1, wherein said graphite powder is natural graphite.

14. The anode material according to claim 1, having an average interlayer spacing $d_{002}$ of not more than 0.3360 nm and L(112) of not less than 15 nm as determined by the Gakushin-method for X-ray diffraction of carbon employing an X-ray diffraction device.

15. A lithium ion secondary battery, comprising:
   the anode material according to claim 1 present on a copper anode;
   an electrolyte solution comprising LiClO$_4$, ethylene carbonate, and propylene carbonate;
   wherein said electrolyte solution is in contact with said graphite powder of said anode material.

16. The battery according to claim 15, exhibiting an irreversible capacity of from 28.2 to 43.6 mAh/g.

17. The battery according to claim 15, exhibiting an initial efficiency of from 90.4 to 93.4%.

18. The anode material for lithium ion secondary battery comprising a mixture of two different coated graphite powders different in average particle size from each other, which are each graphite powders in which interior portions of fine pores are coated with a carbonized material of thermoplastic resin, wherein the mixture of coated graphite powders has:
- (1) a mesopore volume defined by IUPAC is 0.01 cc/g or les as calculated with the BJH method as viewed from desorption isotherm;
- (2) an average particle size as measured by a laser-scattering-particle-size-distribution measuring device ranging from 10 to 50 μm, and a ratio of standard deviation to the average particle size, σ/D, of 0.02 or less; and
- (3) an average interlayer spacing $d_{002}$ of not more than 0.3380 nm and L(112) of not less than 5 nm as determined by the Gakushin-method for X-ray diffraction of carbon employing an X-ray diffraction device, and wherein the mixture of coated graphite powders consist of 50-90 wt % of a graphite powder having an average particle size, prior to coating with a thermoplastic resin, ranging from 18-25 μm and 50-10 wt % of a graphite powder having an average particle size, prior to coating with a thermoplastic resin, ranging from 10-13 μm.

19. The anode material for lithium ion secondary battery according to claim 18, wherein the mixture of coated graphite powders has an H/C value of 0.01 or less as determined by an elemental analysis.

20. The anode material for lithium ion secondary battery according to claim 18, wherein an accumulative pore volume of the mixture of coated graphite powders increases 5% or more, a compared with an accumulative pore volume of the mixture of graphite powders having a pore size of 0.012 μm to 40 82 m as measured by a mercury porosimeter method.

21. The anode material for lithium ion secondary battery according to claim 18, wherein the mesopore volume of the mixture of coated graphite powders is 60% or less of the mesopore volume of the mixture of graphite powders.

22. The anode material for lithium ion secondary battery according to claim 18, wherein the mixture of coated graphite powders is coated with carbonized material of thermoplastic resin of a carbonization yield of not more than 20 wt % in a proportion of not more than 10 parts by weight the carbonized material per 100 parts by weight graphite powder.

23. The anode material for lithium ion secondary battery according to claim 18, wherein the thermoplastic resin is selected from the group consisting of polyvinyl chloride, polyvinyl alcohol and polyvinyl pyrrolidone, and a mixture thereof.

24. A process for the making anode material according to claim 18, comprising:
- i) dry-blending a first and second graphite powder with a first resin powder to form a mixture; and
- ii) baking said mixture in the presence of nitrogen or argon gas to obtain a first and second baked graphite powder.

25. The process according to claim 24, further comprising:
- iii) sifting said first and second baked graphite powder to obtain a mixture of two different coated graphite powders.

26. The process according to claim 24, wherein said baking occurs at a temperature ranging from 700 to 1,100.

27. The anode material according to claim 18, made by a process comprising:
- i) dry-blending a first and second graphite powder with a first resin powder to form a mixture;
- ii) baking said mixture in the presence of nitrogen or argon gas to obtain a first and second baked graphite powder; and
- iii) sifting said first and second baked graphite powder to obtain a mixture of two different coated graphite powders.

28. The anode material according to claim 18, wherein an average interlayer spacing $d_{002}$ of coated graphite powder increases by at most 0.0005 nm, from the average interlayer spacing $d_{002}$ of uncoated graphite powder.

29. The anode material according to claim 18, having an average interlayer spacing $d_{002}$ of not more than 0.3360 nm and L(112) of not less than 15 nm as determined by the Gakushin-method for X-ray diffraction of carbon employing an X-ray diffraction device.

* * * * *